(12) United States Patent
Lin

(10) Patent No.: US 7,203,042 B2
(45) Date of Patent: Apr. 10, 2007

(54) PROTECTIVE CIRCUIT FOR A MOTOR

(75) Inventor: Meng-Chic Lin, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 167 days.

(21) Appl. No.: 10/952,769

(22) Filed: Sep. 30, 2004

(65) Prior Publication Data

US 2006/0067019 A1   Mar. 30, 2006

(51) Int. Cl.
*H02H 5/04* (2006.01)
*H02H 7/08* (2006.01)

(52) U.S. Cl. .......................................... 361/23; 361/30

(58) Field of Classification Search ................. 361/23, 361/30

See application file for complete search history.

(56) References Cited

U.S. PATENT DOCUMENTS 5,744,921 A * 4/1998 Makaran ..................... 318/254

* cited by examiner

*Primary Examiner*—Stephen W. Jackson
*Assistant Examiner*—Dharti H. Patel

(57) ABSTRACT

A protective circuit for a motor includes a motor, a drive unit and a control unit. The drive unit is connected to the motor to drive the motor. The control unit is connected to the drive unit to control output or drive current of the drive unit. The motor and the drive unit are incapable of generating high temperature due to excessive drive current being limited by the control unit such that damage of the drive unit and the motor can be avoided. The control unit is a comparator or an operation amplifier connecting with a comparison circuit composed of a capacitor and a plurality of resistors to produce control signal.

1 Claim, 3 Drawing Sheets

PROTECTIVE CIRCUIT FOR A MOTOR

BACKGROUND OF THE INVENTION

1. Field of the Invention

The present invention is related to a protective circuit for a motor and particularly to a comparison unit associated with a drive unit to avoid the motor producing high instantaneous pulse current and voltage during the motor being started and to avoid the motor and the drive unit occurring high temperature rise to result in damage.

2. Brief Description of the Related Art

Conventionally, coil sets in a motor often produce sparks due to high instantaneous pulse during the motor being started. Referring to FIG. 1, a conventional circuit includes a motor 11, which at least includes a first coil set 120 and a second coil set 111), a drive unit 20, which at least includes a drive IC 210 and a Hall element 220. The drive unit 20 is connected to the motor 11. The Hall element 220 senses magnetic pole change of the rotor in the motor 11 to produce positive voltage H+ and negative voltage H− outputs and the positive and negative voltages H+ and H− outputs are connected to IN+ pin 2109 and IN− pin 2111 of the drive IC 210. The OUT1 pin 2115 is connected to the first coil set 120 and OUT2 pin 2101 of the drive IC 210 is connected to the second coil set 110 so that the motor 10 can be induced to run. However, high instantaneous pulse current and voltage are produced to send the first coil set 120 and the second coil set 110 while the motor 10 is started. Under this circumstance, the temperature of the drive IC 210 and the motor 10 rises quickly and the high temperature is easy to damage the drive IC 210 and the motor 10.

SUMMARY OF THE INVENTION

A primary object of the present invention is to provide a protective circuit of a motor, which can avoid high instantaneous pulse current and voltage while the motor is started, for not only reducing temperature of the motor but also preventing temperature sudden rise of the drive unit to prolong life spans of the drive member and the motor.

Another object of the present invention is to provide a protective circuit of a motor with which drive current for driving the motor can be reduced so as to save energy consumption.

Accordingly, the protective circuit for a motor according to the present invention includes a motor, a drive unit being connected to and driving the motor, a control unit being connected to the drive unit and controlling output or driving current of the drive unit for starting and driving the motor to prevent from high temperature rise resulting from excessively high pulse so as to reduce power consumption and prolong life span of the drive unit and the motor. The control unit can be a comparison circuit composed of a comparator or an operation amplifier being connected to at least a capacitor and a plurality of resistors.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
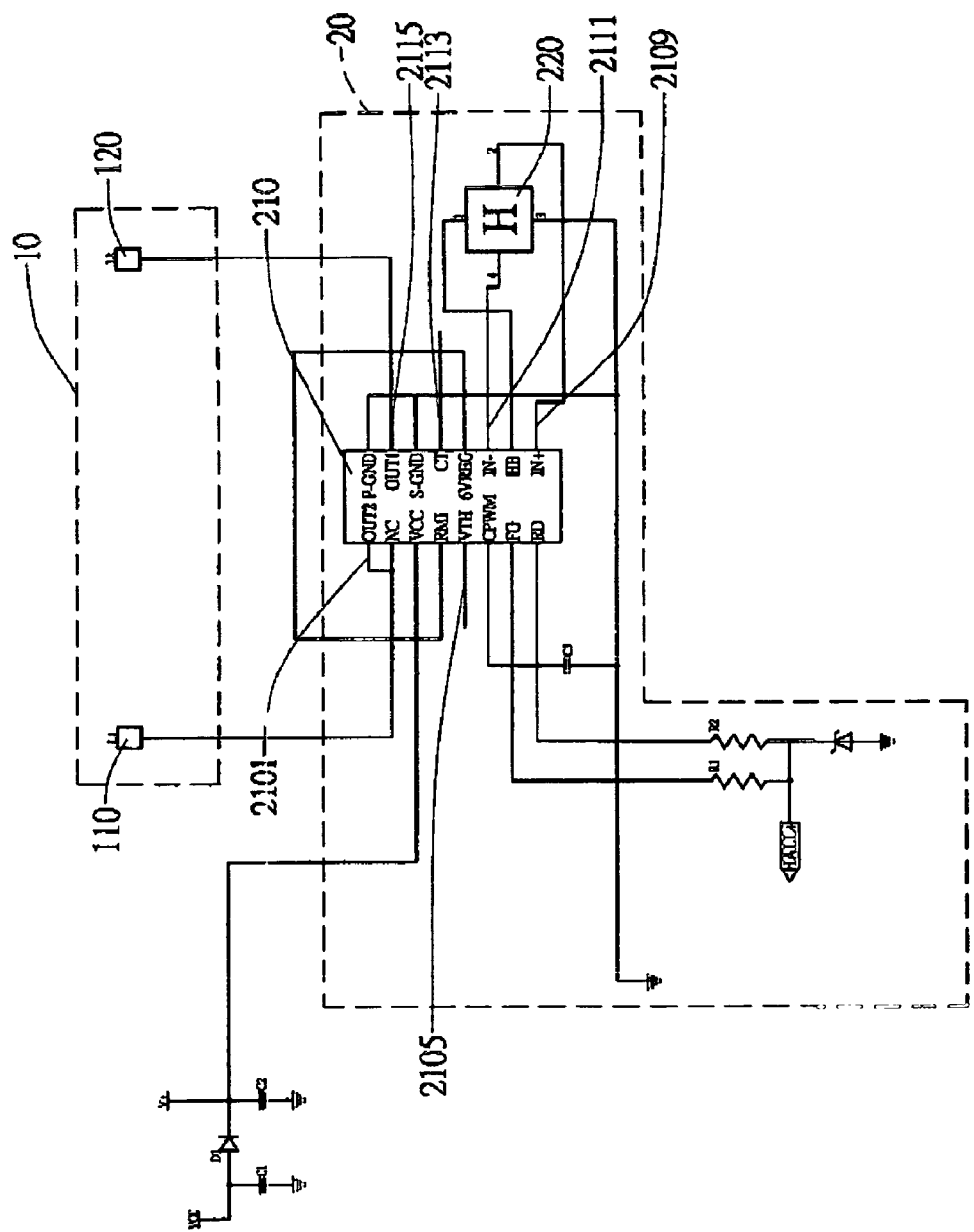
FIG. 1 is a conventional protective circuit diagram of a motor.
Figure 2:
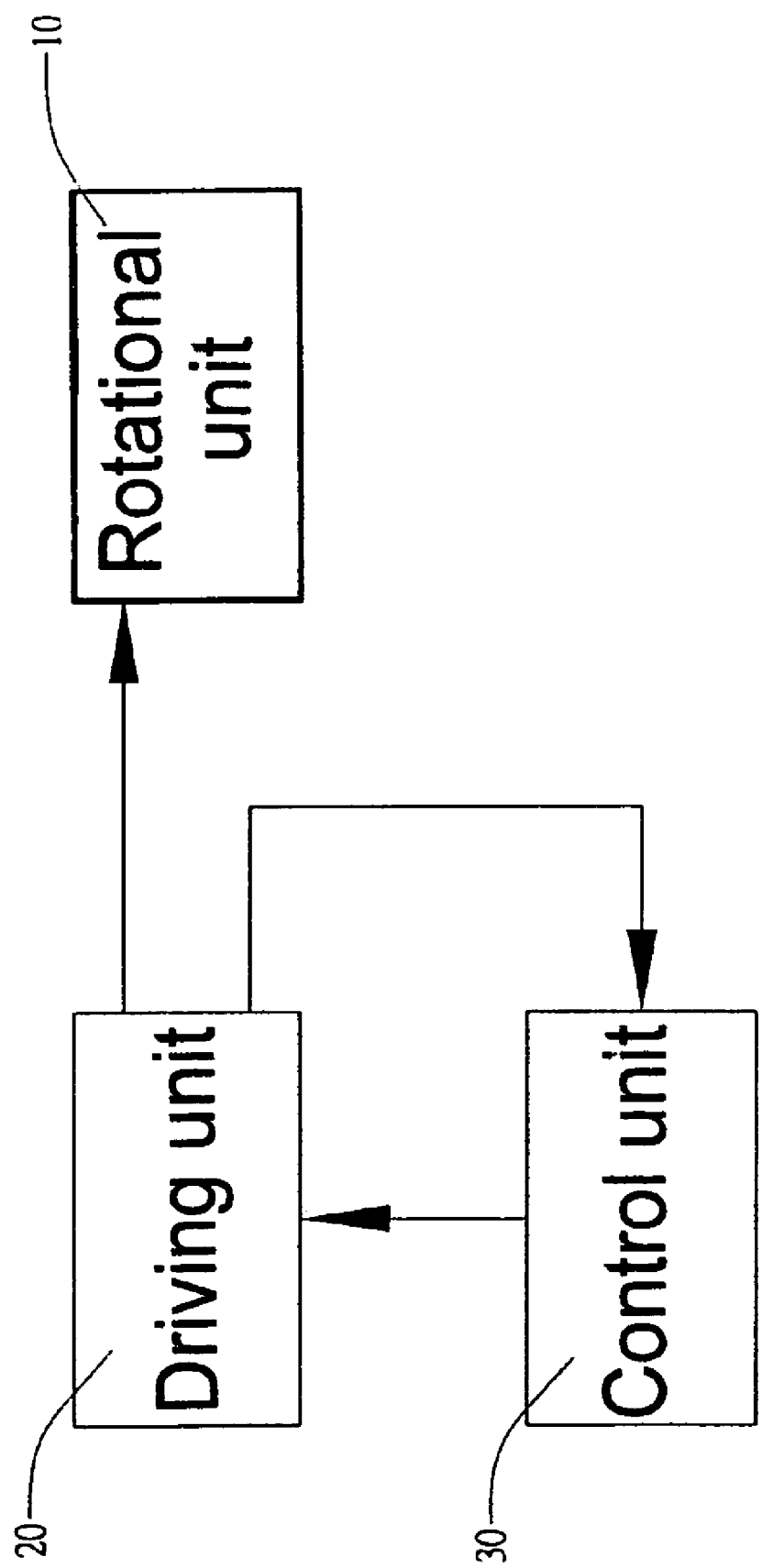
FIG. 2 is a block diagram of a protective circuit for a motor according to the present invention.

Referring to FIG. 2, a block diagram of protective circuit for a motor according to the present invention at least includes a motor 10, a driving unit 20 connected to the motor 10 to drive the motor 10 and a control unit 30 connected to the driving unit 20 to control output or driving current of the driving unit 20.

Figure 3:
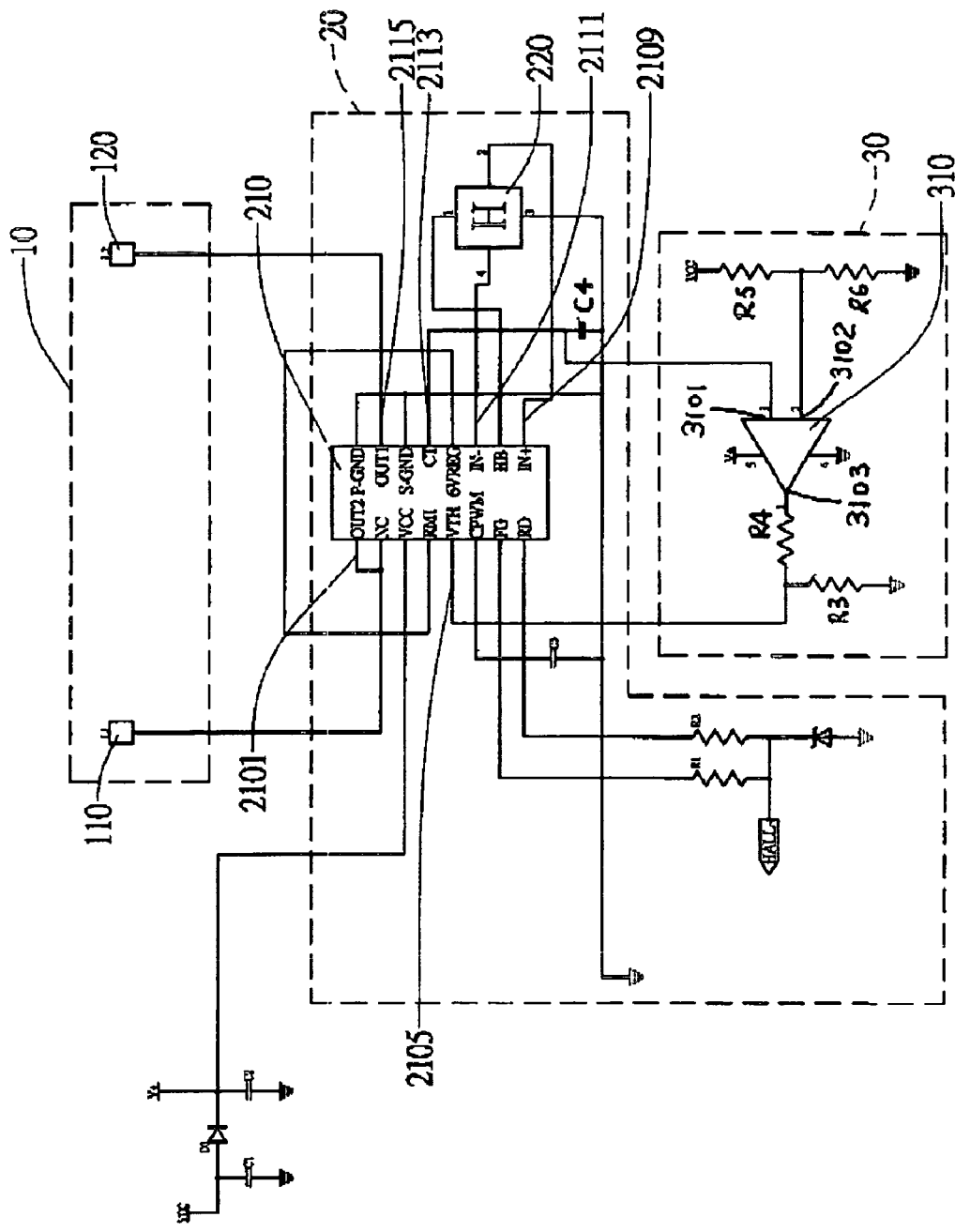
FIG. 3 is a diagram of protective circuit for a motor according to the present invention in a preferred embodiment thereof.

Referring to FIG. 3 in company with FIG. 2, the motor 10 at least includes a first coil set 120 and a second coil set 110. The driving unit 20 at least includes a drive IC 210 and a Hall element 220. The Hall element 220 senses magnetic pole change of the rotor in the motor 10 to create positive voltage H+ and negative voltage H− outputs and the positive voltage H+ and negative voltage H− are transmitted to IN+ pin 2109 and IN− pin 2111 on the drive IC respectively. The first output pin 2115 (OUT1) of the drive IC 210 is connected to the first coil set 120 and the second output pin 2101 (OUT2) of the drive IC 210 is connected to the second coil set 110 such that the motor 10 can be started to run once the driving current is sent to the first coil set 120 and the second coil set 110 via OUT1 and OUT2 respectively.

The control unit 30 at least includes a comparator (or an operation amplifier) 310 and the positive phase input end 3101 of the comparator 310 is connected to a CT pin 2113 of the drive unit 20. The positive phase input end 3101 further parallel connects with a capacitor C4. The negative input end 3102 of the comparator 310 connects with an end of a resistor R5 and an end of a resistor R6 respectively. Another end of the resistor R5 is connected to DC power and another end of the resistor R6 is grounded. Hence, the negative phase input end 3102 of the comparator 310 receives branch voltage signal composed of the resistors R5, R6.

When the motor 10 stops running, the Hall element 220 is incapable of sensing the magnetic pole change of the rotor in the motor 10 such that no positive voltage H+ and negative voltage H− are sent to IN+ and IN− pins of the drive unit 20. Under this circumstance, CT pin 2113 of the drive unit 20 can produce a signal such as pulse wave or square wave to send to the capacitor C4 for the capacitor C4 to perform charge or discharge. Once the capacitor C4 is charged, the positive phase input end 3101 produces a high reference signal due to the voltage at the positive phase input end 3101 being greater than the voltage at the negative phase input end 3102. It is noted that resistors R5, R6 connect with each other in series and the voltage at the negative phase input end 3102 is the branch voltage coming from the resistors R5, R6.

The comparator 310 at the output end 3103 thereof connects with an end of the resistor R4 and another end of the resistor R4 connects with an end of a resistor R3 in series and another end of the resistor R3 is grounded. Hence, a high reference voltage signal at the output end 3103 of the comparator 310 is branched by the resistors R4 and R3. Further, the joint of the resistors R4 and R5 is connected to VTH pin 2105. That is, the VTH pin 2105 receives the branch voltage signal coming from the resistors R3, R4.

When the phase signal received by the VTH pin 2105 is positive phase signal, it means the branch voltage signal coming from the resistors R3, R4 is positive and the positive phase signal received by the VTH pin 2105 is capable of limiting the driving current to output to the first and second coil sets 120, 110 via both of the first output pin 2115 and the second output pin 2102 of the drive unit 20 such that the deficiency of producing high instantaneous pulse current and voltage can be overcome and rapid temperature rise of the drive unit and the motor can be restricted effectively. In addition, unnecessary power consumption can be saved substantially.

Furthermore, in case: of the motor 10 being in a state of stop running continuously and the driving unit 20 drives the rotational unit 10 intermittently, the conventional art is more easier to accumulate the heat quickly so as to result in temperature rise abruptly to damage the motor 10 and the driving unit 20. The protective circuit of the present invention can reduce or control the driving current such that the motor 10 and driving unit 20 can only have temperature rise with a speed corresponding to the heat dissipation speed to avoid overheat and burn-out of the driving unit or the motor.

It is appreciated that the protective circuit for a motor according to the present invention is capable of reducing drive current of the motor 10 substantively to save the power consumption and maintaining temperature of the drive IC 210 and the motor 10 at a steady state so that life spans of the motor and drive unit can be prolonged effectively.

While the invention has been described with referencing to a preferred embodiment thereof, it is to be understood that modifications or variations may be easily made without departing from the spirit of this invention, which is defined by the appended claims.

What is claimed is:

1. A protective circuit for a motor, comprising:
   a motor with a rotor, providing a first coil set and a second coil set;
   a drive unit, further comprising a drive IC, which has an out 1 pin, out 2 pin, a VTH pin, a CT pin, an IN+ pin and an IN− pin, and a Hall element, which has a positive voltage output end and a negative voltage end, wherein the positive voltage output end is connected to the IN+ pin and the negative output end is connected to the IN− pin, and the out 1 pin is connected to the first coil set and the out 2 pin is connected to the second coil set;
   a control unit, further comprising a comparator, which has a positive phase input end, a negative phase input end and an output end, wherein the positive phase input end connects with the CT pin, the negative phase input end connects with an end of a first resistor and an end of a second resistor, the output end connects with an end of a third resistor, the positive phase input end further connects with a capacitor in parallel, another end of the first resistor connects with a direct current power source, another end of the second resistor is grounded, another end of the third resistor connects with an end of a fourth resistor in series, another end of the fourth resistor is grounded, and a joint between the third resistor and the fourth resistor is connected to the VTH pin;
   characterized in that when the motor stops running, the Hall element is incapable of sensing the magnetic pole change of the rotor such that no positive voltage and negative voltage outputting to IN+ and IN− pins and then the CT pin sends a signal to the capacitor to perform charge and discharge; and once the capacitor is charged, voltage at the positive phase input end is greater than a first branch voltage signal of the negative phase input received from the first and the second resistors such that the output end produces a high reference voltage signal and the high reference voltage signal is treated by the third and the fourth resistors as a second branch signal received by the VTH pin to limit currents sent to the first and second coil sets for avoiding to produce high instantaneous pulse current and voltage.

\* \* \* \* \*